(12) United States Patent
Ha et al.

(10) Patent No.: US 12,052,406 B2
(45) Date of Patent: Jul. 30, 2024

(54) DISPLAY APPARATUS AND OPERATING METHOD OF THE SAME

(71) Applicant: Samsung Electronics Co., Ltd., Suwon-si (KR)

(72) Inventors: Inwoo Ha, Seongnam-si (KR); Sunghoon Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 17/208,049

(22) Filed: Mar. 22, 2021

(65) Prior Publication Data

US 2022/0070427 A1  Mar. 3, 2022

(30) Foreign Application Priority Data

Sep. 2, 2020  (KR) .................. 10-2020-0111697

(51) Int. Cl.
*H04N 13/133* (2018.01)
*H04N 13/15* (2018.01)
*H04N 13/305* (2018.01)
*H04N 13/383* (2018.01)

(52) U.S. Cl.
CPC .......... *H04N 13/133* (2018.05); *H04N 13/15* (2018.05); *H04N 13/305* (2018.05); *H04N 13/383* (2018.05); *H04N 2213/005* (2013.01)

(58) Field of Classification Search
USPC ........................................... 348/54
See application file for complete search history.

(56) References Cited

U.S. PATENT DOCUMENTS

| | | | |
|---|---|---|---|
| 2017/0237971 A1* | 8/2017 | Pitts ............... | H04N 13/117 345/419 |
| 2019/0082168 A1* | 3/2019 | Lee ............... | H04N 13/31 |

FOREIGN PATENT DOCUMENTS

| | | |
|---|---|---|
| CN | 102138331 A | 7/2011 |
| KR | 10-0218380 B1 | 9/1999 |
| KR | 10-1661215 B1 | 9/2016 |
| KR | 10-2017-0053270 A | 5/2017 |
| KR | 10-1829459 B1 | 2/2018 |
| KR | 10-1944911 B1 | 2/2019 |

* cited by examiner

Primary Examiner — Mikhail Itskovich
(74) Attorney, Agent, or Firm — NSIP Law

(57) ABSTRACT

An method of operating a display apparatus is provided. The operating method includes calculating a confidence of a result obtained by performing light field rendering on each of pixels of a display panel based on positions of a left eye and a right eye, determining a weight kernel of a corresponding pixel based on the confidence, and adjusting a brightness of a pixel corresponding to each of the left eye and the right eye based on the weight kernel.

32 Claims, 8 Drawing Sheets

DISPLAY APPARATUS AND OPERATING METHOD OF THE SAME

CROSS-REFERENCE TO RELATED APPLICATIONS

This application claims the benefit under 35 USC § 119(a) of Korean Patent Application No. 10-2020-0111697, filed on Sep. 2, 2020, in the Korean Intellectual Property Office, the entire disclosure of which is incorporated herein by reference for all purposes.

BACKGROUND

Field

The following description relates to a display apparatus and an operating method of the display apparatus.

Description of Related Art

Many currently commercialized three-dimensional (3D) display devices provide depth perception by displaying different images on both eyes of a user. In this case, while binocular disparity information is provided to the user, a monocular depth recognition factor, for example, a focal adjustment and a motion parallax, is not transferred to the user. Thus, the unnatural display of the 3D image may strain the eyes.

3D display technologies for displaying spatio-angular distribution of rays, i.e., a light field are utilized to display an eyestrain-free and natural 3D image. The light field refers to distribution of rays based on positions or directions of rays output from an object. When the light field is optically displayed on a surface, a user positioned behind the surface experiences the ray distribution as if an actual object is present and views a natural 3D image of the object.

The above description has been proposed by the inventor(s) in the course of conceiving the present disclosure and is not publicly known material before the present application is filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of operating a display apparatus, the method including calculating a confidence of a result obtained by performing light field rendering on each of pixels of a display panel based on positions of a left eye and a right eye, determining a weight kernel of a corresponding pixel based on the confidence, and adjusting a brightness of a pixel corresponding to each of the left eye and the right eye based on the weight kernel.

The weight kernel may be determined to reduce a brightness of the corresponding pixel in response to a decrease in the confidence.

The weight kernel may be determined to maintain a brightness of each of pixels having a confidence greater than or equal to a reference value.

The determining of the weight kernel may include obtaining a characteristic of content to be represented by the display panel, and determining the weight kernel according to the confidence and the characteristic of content.

The determining of the weight kernel may include increasing a brightness of a corresponding pixel, in response to the confidence being greater than or equal to a reference value, and reducing the brightness of the corresponding pixel, in response to the confidence being less than the reference value.

The determining of the weight kernel may include determining the weight kernel for each three-dimensional (3D) virtual object represented by the display panel.

The determining of the weight kernel may include estimating a depth between a 3D virtual object represented by the display panel and the left eye and the right eye, and determining the weight kernel according to the confidence and the depth.

The method may include determining the weight kernel to increase a brightness of a corresponding pixel, in response to the depth being greater than a reference depth, and determine the weight kernel to reduce the brightness of the corresponding pixel, in response to the depth being less than or equal to the reference depth.

The adjusting of the brightness of the pixel may include adjusting intensities of subpixels included in the pixel based on the weight kernel.

The adjusting of the brightness of the pixel may include obtaining a first value of a corresponding pixel from an image corresponding to the left eye, obtaining a second value of the corresponding pixel from an image corresponding to the right eye, determining intensities of subpixels included in both the first value and the second value, based on intensities of subpixels included in the first value and intensities of subpixels included in the second value, and adjusting the brightness of the pixel, based on the determined intensities of the subpixels.

The adjusting of the brightness of the pixel may include, for each of the pixels obtaining a value of a corresponding pixel from an image corresponding to one of the left eye and the right eye based on a result obtained by performing light field rendering on the corresponding pixel, and applying a weight kernel of the corresponding pixel to the obtained value of the pixel.

The calculating of the confidence may include determining the confidence of whether each of the pixels corresponds to the left eye or the right eye, by performing light field rendering on each of the pixels based on the positions of the left eye and the right eye.

The method may include tracking the positions of the left eye and the right eye.

The method may include determining whether the positions of any of the left eye and the right eye are changed, based on a result of the tracking, wherein the determining of the weight kernel comprises changing the weight kernel based on whether the positions of the left eye and the right eye are changed.

The method may include obtaining a parameter of the display apparatus, wherein the determining of the weight kernel comprises determining the weight kernel according to the confidence and the parameter of the display apparatus.

The performing of the light field rendering may include determining whether each of the pixels of the display panel is to provide an image for one or more of the left eye and the right eye.

The adjusting of the brightness may include in response to the confidence of a pixel corresponding to a ray being less than a threshold, assigning a minimum value among color values of an image for the left eye and an image for the right eye to the pixel corresponding to the ray.

In another general aspect, there is provided a display apparatus including a display panel, and a processor configured to calculate a confidence of a result obtained by performing light field rendering on each of pixels of the display panel based on positions of a left eye and a right eye, determine a weight kernel of a corresponding pixel based the confidence, and adjust a brightness of a pixel corresponding to each of the left eye and the right eye based on the weight kernel.

The weight kernel may be determined to reduce a brightness of the corresponding pixel in response to a decrease in the confidence.

The weight kernel may be determined to maintain a brightness of each of pixels having a confidence greater than or equal to a reference value.

The processor may be configured to obtain a characteristic of content to be represented by the display panel, and to determine the weight kernel according to the confidence and the characteristic of content.

The processor may be configured to increase a brightness of a corresponding pixel in response to the confidence being greater than or equal to a reference value, and to reduce the brightness of the corresponding pixel in response to the confidence being less than the reference value.

The processor may be configured to determine the weight kernel for each three-dimensional (3D) virtual object represented by the display panel.

The processor may be configured to estimate a depth between a 3D virtual object represented by the display panel and the left eye and the right eye, and to determine the weight kernel according to the confidence and the depth.

The processor may be configured to adjust intensities of subpixels included in the pixel based on the weight kernel.

The processor may be configured to obtain a first value of a corresponding pixel from an image corresponding to the left eye, to obtain a second value of the corresponding pixel from an image corresponding to the right eye, to determine intensities of subpixels included in both the first value and the second value, based on intensities of subpixels included in the first value and intensities of subpixels included in the second value, and to adjust the brightness of the pixel, based on the determined intensities of the subpixels.

For each of the pixels, the processor may be configured to obtain a value of a corresponding pixel from an image corresponding to one of the left eye and the right eyebased on a result obtained by performing light field rendering on the corresponding pixel, and to apply a weight kernel of the corresponding pixel to the obtained value of the pixel.

The processor may be configured to determine the confidence of whether each of the pixels corresponds to the left eye or the right eye, by performing light field rendering on each of the pixels based on the positions of the left eye and the right eye.

The processor may be configured to track the positions of the left eye and the right eye.

The processor may be configured to determine whether the positions of any of the left eye and the right eye are changed, based on a result of the tracking, and to change the weight kernel based on whether the positions of the left eye and the right eye are changed.

A communication interface may be configured to obtain a parameter of the display apparatus, wherein the processor is further configured to determine the weight kernel according to the confidence and the parameter of the display apparatus.

The display apparatus may be comprised in any one or any combination of a head-up display (HUD) device, a 3D digital information display (DID), a navigation device, a 3D mobile device, a smartphone, a smart television (TV), a tablet, a smart vehicle, and an Internet of things (IoT) device.

Other features and aspects will be apparent from the following detailed description, the drawings, and the claims.

Figure 1A:
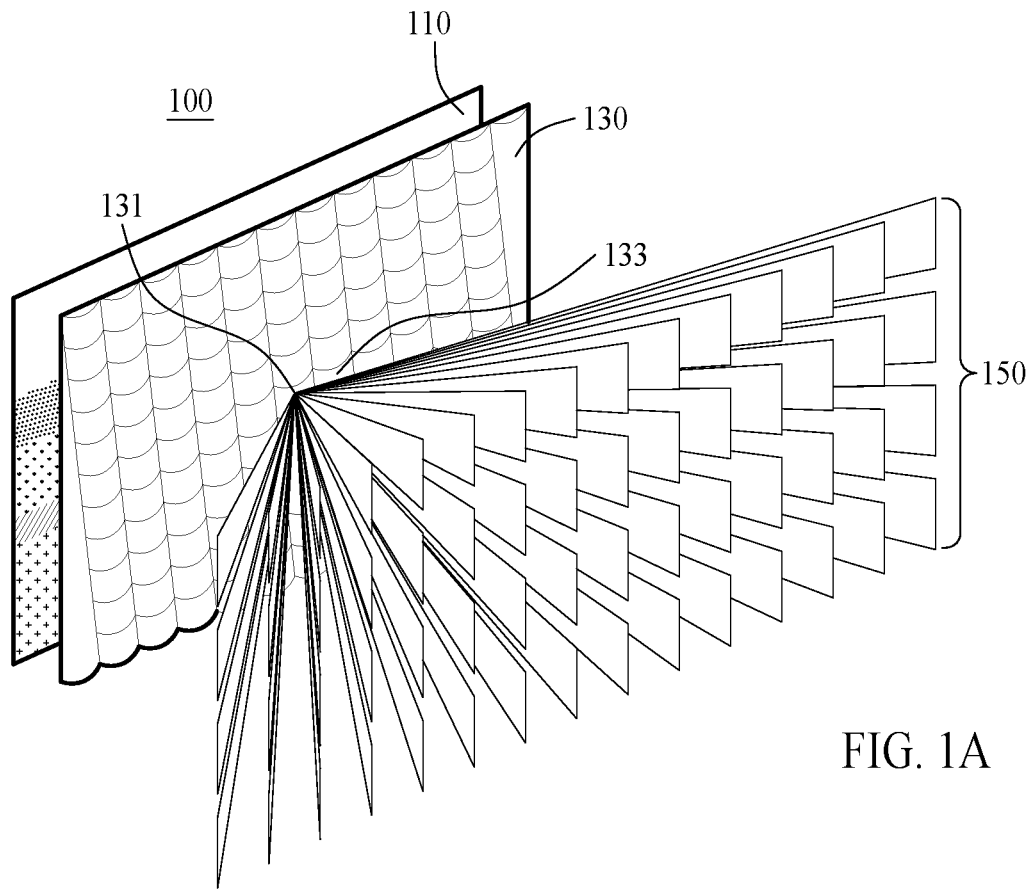
FIGS. 1A and 1B illustrate an example of a structure and an operation of a display pattern of a display apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be described in detail with reference to the accompanying drawings. The scope of the examples is not limited to the descriptions provided in the present specification. Like reference numerals in the drawings denote like elements, and a known function or configuration will be omitted herein.

Various modifications may be made to the examples. Here, the examples are not construed as limited to the disclosure and should be construed to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component. In addition, terms such as first, second, A, B, (a), (b), and the like may be used herein to describe components. Each of these terminologies is not used to define an essence, order, or sequence of a corresponding component but used merely to distinguish the corresponding component from other component(s).

The terminology used herein is for the purpose of describing particular examples only and is not to be limiting of the examples. As used herein, the singular forms "a", "an", and "the" are intended to include the plural forms as well, unless the context clearly indicates otherwise. It will be further construed that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Figure 1B:
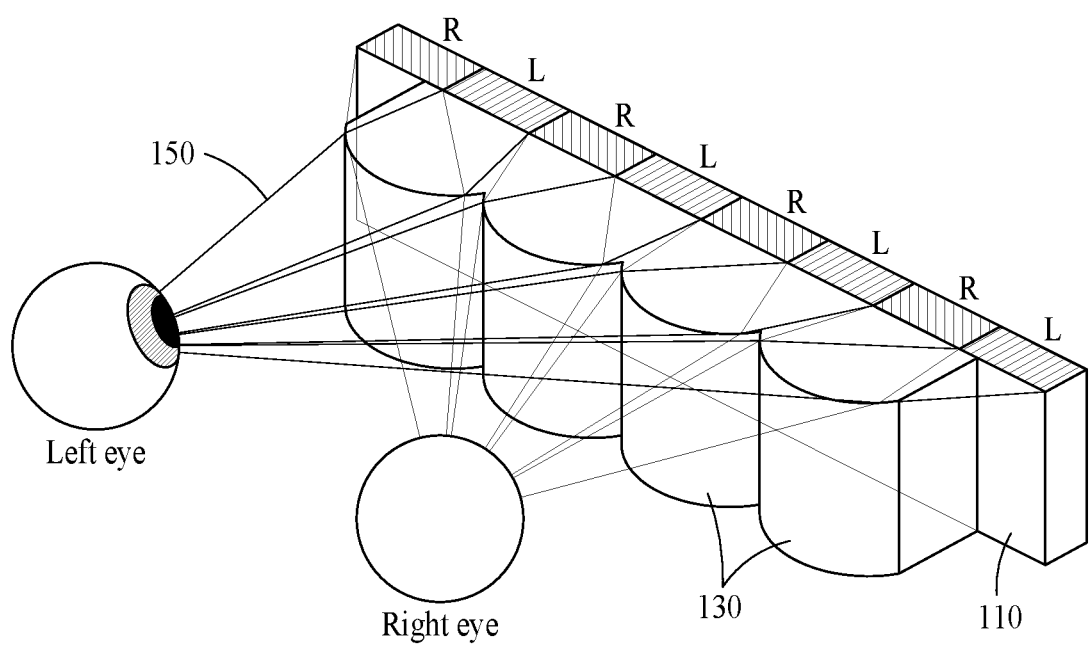

FIGS. 1A and 1B illustrate an example of a structure and an operation of a display pattern of a display apparatus 100. FIG. 1A illustrates an example of a configuration of the display apparatus 100.

The display apparatus 100 may perform, for example, light field rendering. In the following description, a "light field" expresses a state in which light is distributed in a space through distribution of rays. Based on the above concept, light generated or reflected from an object may be defined as going straight through a space and entering human eyes, and a three-dimensional (3D) space may include countless light fields. The term "rendering" used herein may be construed as an operation of generating an image to be displayed on a display panel 110 to generate a light field in a 3D space. An example of light field rendering will be described below.

The display apparatus 100 may be implemented as various devices including such devices as, for example, a head-up display (HUD) device, display of an advanced driver-assistance systems (ADAS), and eye glass display (EGD), a 3D digital information display (DID), a navigation device, a 3D mobile device, a smartphone, a smart television (TV), a computer monitor, a tablet, a smart vehicle, and an Internet of things (IoT) device.

The display apparatus 100 may represent light that is multi-directionally output from points present on a space, without a change. The display apparatus 100 may employ a principle that an actual object generates or reflects light multi-directionally at a single point. "Rendering" may be, for example, an operation of determining a value of a pixel or a subpixel included in the display panel 110 to generate a light field in a 3D space. An example of a method by which the display apparatus 100 performs light field rendering will be further described below with reference to FIG. 2.

The display apparatus 100 may include the display panel 110 including pixels, and an optical layer 130 that transmits light emitted or output from the pixels. A structure of subpixels constituting each of the pixels of the display panel 110 may be variously modified. The subpixels may include, for example, red (R) pixels, green (G) pixels and blue (B) pixels. For example, the display panel 110 may be an RGB panel in which subpixels are arranged in a striped pattern, or a PenTile™ panel in which subpixels are arranged in a diamond pattern.

For example, the display apparatus 100 may implement rays in different directions based on a PenTile™ panel. A general RGB panel has a subpixel structure in which a single pixel includes an R subpixel, a G subpixel, and a B subpixel, each having identical sizes. In an R subpixel, a G subpixel, and a B subpixel included in the PenTile™ panel may have different sizes. The G subpixel and the R subpixel may be diagonally arranged in a single pixel. Also, the G subpixel and the B subpixel may be diagonally arranged in a single pixel. An arrangement of subpixels in a single pixel may be variously changed. In addition, a size and a form of each of the R subpixel, the G subpixel, and the B subpixel may be variously changed.

The optical layer 130 may include various optical filters, for example, a lenticular lens of FIGS. 1A and 1B, a parallax barrier, a lens array, and a micro-lens array. Also, the optical layer 130 may include a directional backlight unit. In examples, in addition to the aforementioned optical filter, the optical layer 130 may include other types of optical layers that may be disposed on a front surface or a rear surface of a display.

A direction of a ray output from a pixel or a subpixel included in the display panel 110 may be determined through the optical layer 130. Light output from each subpixel may be radiated or output in a particular direction while passing through the optical layer 130. Through the above process, the display apparatus 100 may represent a stereoscopic image or a multi-view image. An optical characteristic of the display apparatus 100 may include a characteristic associated with a direction of a ray of a subpixel included in the display panel 110.

The optical layer 130 may include a plurality of optical elements 131 and 133. Each of the optical elements may be referred to as a "3D picture element". A single 3D picture element may output rays that include different information in multiple directions. For example, rays 150 in 15×4 directions may be output from a single 3D picture element included in the optical layer 130. The display apparatus 100 may represent points on the 3D space using a plurality of 3D picture elements. In this example, positions and/or sizes of subpixels in the display panel 110 may vary based on a subpixel structure of the display panel 110. Thus, a direction of a ray output from each subpixel in the display panel 110 may vary based on the subpixel structure of the display panel 110.

FIG. 1B illustrates an example in which light propagated in a direction of a ray of each subpixel of the display panel 110 reaches both eyes of a user. Hereinafter, the user may correspond to, for example, a user viewing an image or content displayed by the display apparatus 100.

When a user is in a view area of the display panel 110, images corresponding to both eyes of the user may be determined as follows. For example, when light propagated in a ray direction of a pixel or a subpixel is determined to reach to be closer to a left eye of the user than a right eye of the user, the pixel may be determined to correspond to a left image. When light propagated in a ray direction of a pixel is determined to reach to be closer to the right eye than the left eye, the pixel may be determined to correspond to a right image.

The display apparatus 100 may implement rays in different directions using various lenses. The display panel 110 may include subpixels that represent an image. Also, the optical layer 130 may correspond to a set of optical elements that function to limit light emitted from each subpixel to a particular direction.

The optical layer 130 may include, for example, a windshield of a vehicle. Depending on examples, the optical layer 130 may include side glasses or rear glasses of a vehicle.

Figure 2:
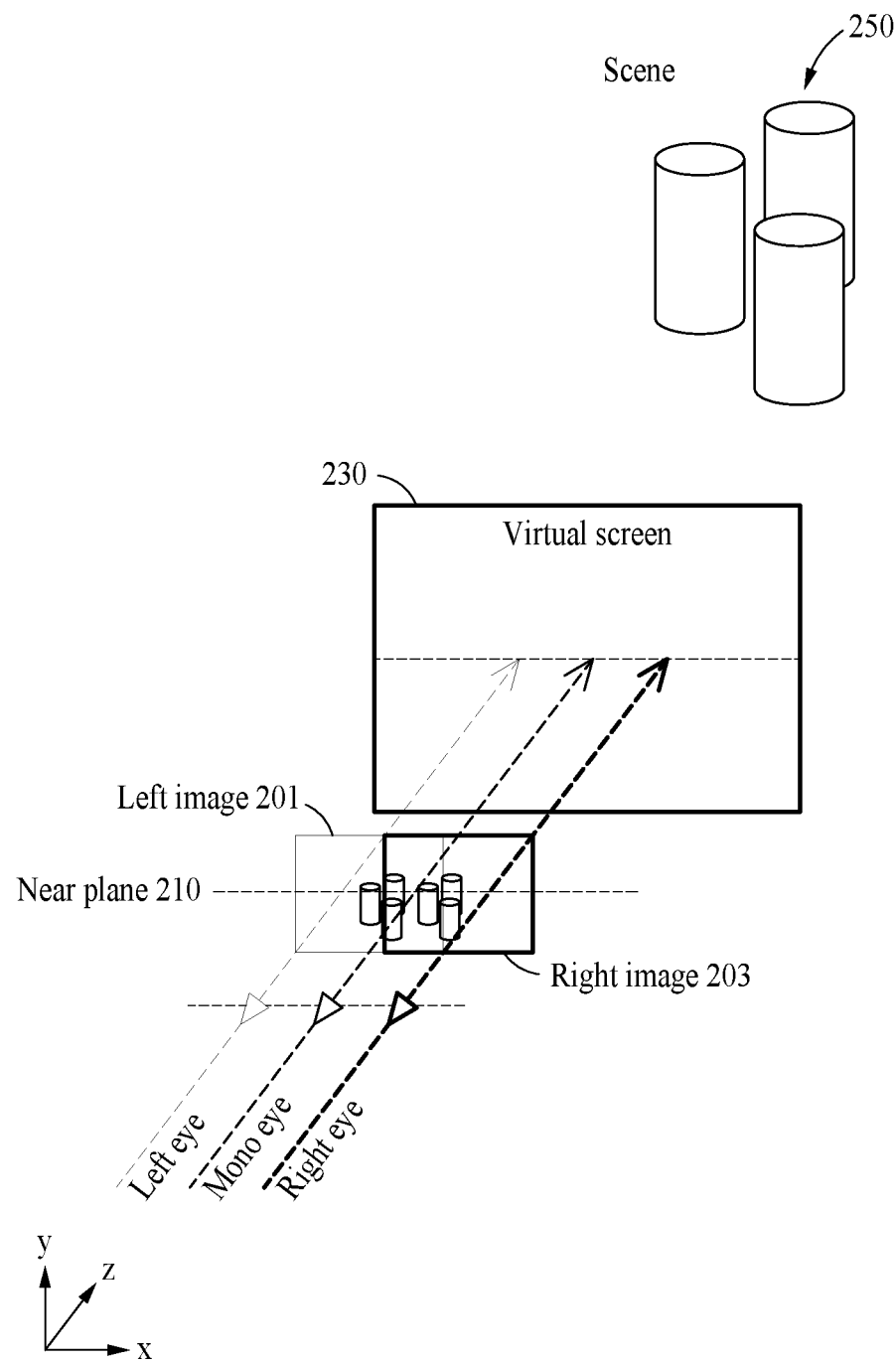
FIG. 2 illustrates an example of a method of generating a light field image in a display apparatus.

FIG. 2 illustrates an example of a method of generating a light field image in a display apparatus.

Since a two-dimensional (2D) image expresses image information acquired by projecting 3D spatial information in 2D, there is no problem even if an acquisition time and an expression time are different. However, when a light field of a 3D space is acquired and expressed and when a viewpoint of a camera to acquire the light field and a viewpoint of a projector to express the light field are different, it may not be possible to directly use image information acquired by the camera in the projector.

Thus, rendering may be performed by changing a viewpoint of a rendering camera to a viewpoint of a projector, instead of a viewing viewpoint of a user plane, so that a light field may be quickly and accurately generated using light field information without a need to convert the light field information.

In an example, a display apparatus may receive vertices of a graphic object displayed on a near plane 210 near a user or a camera, and may project the vertices of the graphic object onto a far plane 230. In this example, the graphic object may include a left image 201 corresponding to a left eye of the user, and a right image 203 corresponding to a right eye of the user. The far plane 230 may be a plane corresponding to a first distance of a direction of a screen on which a light field is reproduced, and may correspond to a virtual screen. The display apparatus may project the vertices of the graphic object onto the far plane 230 by performing a matrix operation of projecting at least one vertex of the graphic object onto the far plane 230.

The display apparatus may convert at least one vertex of the graphic object located at a first distance farthest from the camera among the vertices of the graphic object to be located at a second distance closest to the camera. Also, the display apparatus may convert at least one vertex of the graphic object located at the second distance among the vertices of the graphic object to be located at the first distance. The "first distance" may be a distance corresponding to a farthest position where all graphic objects may be expressed in a direction from a position of the camera of the display apparatus to the screen, and may correspond to a distance from the camera or the projector to the far plane 230 or the virtual screen. The "second distance" may be a distance corresponding to a nearest position where all graphic objects may be expressed, and may correspond to a distance to the near plane 210. In an example, the first distance and the second distance may be input by a user along with upper, lower, right, and left positions of a display panel to which the graphic object is to be projected.

As described above, the display apparatus may project the vertices of the graphic object to be displayed, onto the far plane 230, not the near plane 210, and may generate a scene 250 of a light field image for the graphic object using the vertices of the graphic object projected on the far plane 230.

Figure 3:
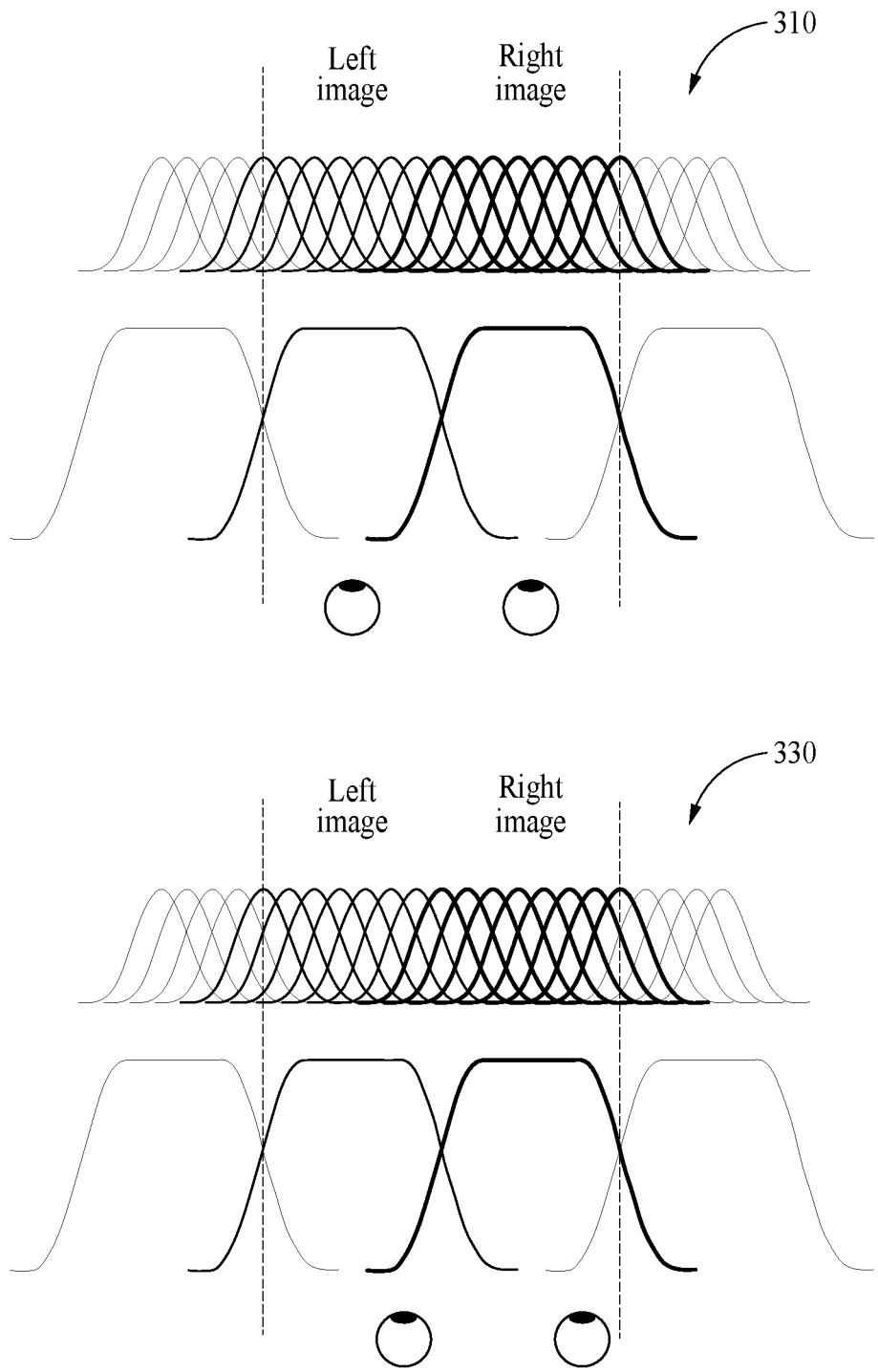
FIG. 3 illustrates an example in which crosstalk occurs in a display apparatus.

FIG. 3 illustrates an example in which crosstalk occurs in a display apparatus. FIG. 3 illustrates an example 310 in which both eyes of a user are accurately located within a view area, and an example 330 in which each of the eyes is out of the view area.

For example, a display apparatus may define an area corresponding to a width of a view area based on a left eye of a user or both the left eye and a right eye of the user, and may display eye directions of users within the defined area. The display apparatus may determine a ray direction range in which an image for both eyes is to be displayed based on directions of both eyes are mapped in a single view area.

The display apparatus may map positions of both eyes of a user to a view area, based on an iterative characteristic due to relative positions between pixels of the display panel 110 of FIGS. 1A and 1B and the plurality of optical elements 131 and 133 included in the optical layer 130. The "view area" may be an area within a viewing angle range by a view of a user, and may correspond to a ray direction range in which each image corresponding to both eyes of the user is to be displayed.

The display apparatus may display different images, for example, a stereo image, on the eyes by a large number of rays. When a number of rays represented in a single pixel increases, a resolution of an image represented by the display apparatus may decrease, or crosstalk may occur due to interference between a relatively large number of rays within a viewing angle. Even when positions of both eyes of a user do not match a view area, crosstalk may also occur.

In the example 310 in which the eyes are accurately located within the view area, an image corresponding to each of the eyes may be accurately displayed by rays corresponding to each pixel. In the example 330 in which each of the eyes is out of the view area, an image corresponding to the right eye may be incorrectly displayed on the left eye. In this example, a 3D image represented by a disparity between the eyes may be unnaturally displayed, which may cause eyestrain. An example of a position relationship between both eyes and a position to which rays output from a pixel are propagated will be further described below with reference to FIG. 6.

Thus, the display apparatus may adjust a brightness of a pixel of a margin area having a confidence less than a threshold so that an image generated by rays corresponding to each of both eyes of a user may be displayed based on positions of the eyes, to prevent crosstalk from occurring. Also, the display apparatus may adjust a brightness of a pixel of a margin area according to various circumstances including a change of positions of both eyes of a user, by changing a parameter of a weight kernel, and thus it is possible to provide a 3D image that is more accurate and comfortable for the eyes.

Figure 4:
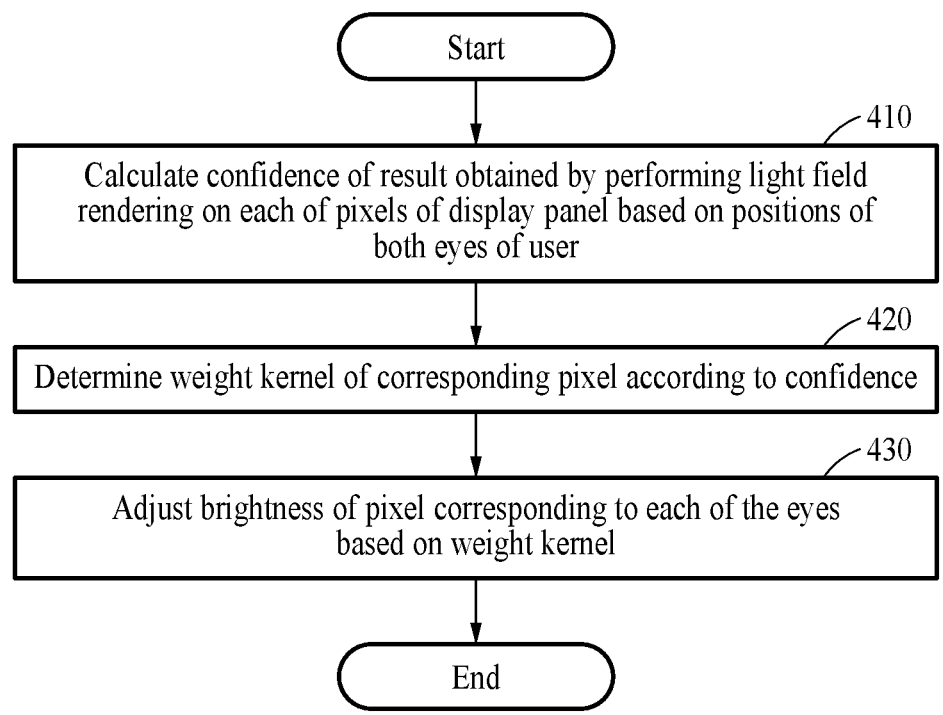
FIG. 4 illustrates an example of an operating method of a display apparatus.

FIG. 4 illustrates an example of an operating method of a display apparatus. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, the display apparatus may reproduce a 3D image on a display panel by adjusting a brightness of a pixel corresponding to each of both eyes of a user including a left eye and a right eye through operations 410, 420 and 430.

In operation 410, the display apparatus calculates a confidence of a result obtained by performing light field rendering on each of pixels of the display panel based on positions of the eyes. The display apparatus may perform light field rendering on each of the pixels based on the positions of the eyes, to determine the confidence and whether each of the pixels corresponds to the left eye or the right eye.

In operation 420, the display apparatus determines a weight kernel of a corresponding pixel according to the confidence calculated in operation 410. The weight kernel may be expressed in a form of, for example, a Gaussian function, and may also be referred to as a "weight function". The weight kernel may include, for example, a brightness of a pixel corresponding to a ray representing an image for each of the eyes of the user, and a parameter for a margin area in which the confidence is less than a threshold.

In operation 420, the weight kernel may be determined based on various schemes.

In an example, the weight kernel may be determined to reduce a brightness of a corresponding pixel when the confidence calculated in operation 410 decreases. In another example, the weight kernel may be determined to maintain a brightness of each of pixels having a confidence greater than or equal to a reference value, and to reduce a brightness of each of pixels having a confidence less than the reference value.

The display apparatus may acquire a characteristic of content to be represented by the display panel, and may determine the weight kernel according to the confidence based on the characteristic of the content. In an example, the display apparatus may determine the weight kernel for each 3D virtual object represented by the display panel. The display apparatus may estimate a depth between a 3D virtual object represented by the display panel and the eyes. The display apparatus may determine the weight kernel according to the confidence based on the estimated depth.

Depending on examples, the display apparatus may obtain a parameter of the display apparatus, and may determine the weight kernel according to the confidence calculated in operation 410, based on the parameter of the display apparatus. An example in which the display apparatus determines the weight kernel will be further described below with reference to FIG. 5.

In operation 430, the display apparatus adjusts a brightness of a pixel corresponding to each of the eyes, based on the weight kernel determined in operation 420. The display apparatus may adjust intensities of subpixels included in the pixel, based on the weight kernel determined in operation 420. In an example, when the confidence is greater than or equal to a reference value, the display apparatus may increase a brightness of a corresponding pixel. In another example, when the confidence is less than the reference value, the display apparatus may reduce the brightness of the corresponding pixel.

In operation 430, for each of the pixels, the display apparatus obtains a value of a corresponding pixel from an image corresponding to one of the eyes based on a result obtained by performing light field rendering on the corresponding pixel. The display apparatus may apply a weight kernel of the corresponding pixel to the obtained value of the pixel. For example, the display apparatus may determine a value of a pixel of the display panel corresponding to each of the eyes by performing light field rendering based on the positions of the eyes, based on the weight kernel. The light field rendering may correspond to, for example, a process of determining which one of rays output through a lenticular lens, a parallax barrier, or a directional backlight is propagated to a right eye or left eye of a user. The display apparatus may determine, through the light field rendering, whether each of the pixels of the display panel needs to reproduce an image for the left eye or an image for the right eye. In this example, the value of the pixel may be construed to include all of a color, a brightness and an intensity of the pixel.

For example, the display apparatus may determine intensities of subpixels in an image that needs to be represented by a ray direction range including directions of rays emitting from the subpixels. The intensities of the subpixels may be determined based on a position relationship between the optical layer 130 and the subpixels included in the display panel 110 that are described above with reference to FIGS. 1A and 1B.

In an example, in operation 430, the display apparatus may obtain a first value of the corresponding pixel from an image corresponding to the left eye. The display apparatus may obtain a second value of the corresponding pixel from an image corresponding to the right eye. The display apparatus may determine intensities of subpixels included in both the first value and the second value, based on intensities of subpixels included in the first value and intensities of subpixels included in the second value. The display apparatus may adjust the brightness of the pixel based on the determined intensities of the subpixels.

The display apparatus may reproduce the brightness of the pixel adjusted in operation 430 on the display panel. For example, an image reproduced on the display panel may be output by rays with directivity using, for example, a lenticular lens, and the rays may be refracted at an optical layer such as a windshield of a vehicle and may be propagated toward a user, for example, a driver. A user may view different images, for example, a stereo image, at the left eye and the right eye, and accordingly the user may experience a 3D image including a 3D virtual object.

Figure 5:
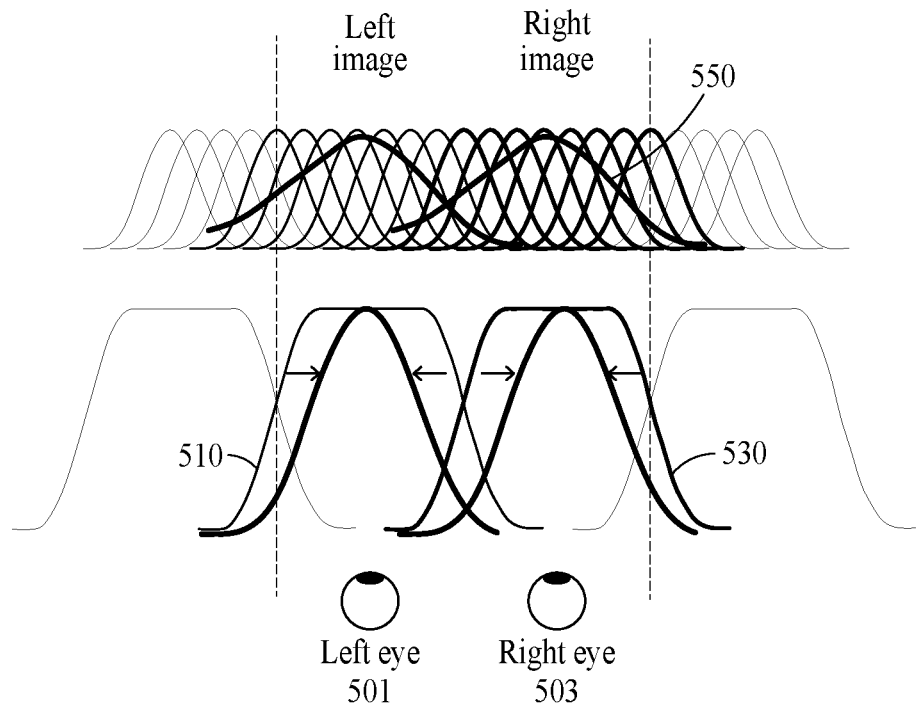
FIG. 5 illustrates an example of determining a weight kernel of a pixel.

FIG. 5 illustrates an example of determining a weight kernel of a pixel. FIG. 5 illustrates a view area 510 corresponding to a left image corresponding to a left eye 501 of a user, and a view area 530 corresponding to a right image corresponding to a right eye 503 of the user.

Each of the view areas 510 and 530 may correspond to a range of directions of rays that is to represent an image corresponding to each of both eyes of the user, and a brightness of a pixel for a margin area having a confidence less than a threshold in each of the view areas 510 and 530 may be adjusted. A margin area of each of the view areas 510 and 530 may be expanded or reduced in a form such as a Gaussian function. Each of the view areas 510 and 530 may correspond to an area within a minimum allowable separation distance based on a central portion of each of the eyes.

The minimum allowable separation distance may be a minimum distance that causes crosstalk in an acceptable range, and may correspond to a minimum distance that causes crosstalk below a level in both sides based on centers of both eyes (for example, positions of eyeballs) when different images are represented on both the sides.

In an example, when a ray output from a pixel is propagated to a position between the left eye 501 and the right eye 503, a confidence of a result obtained by performing light field rendering on each of pixels of a display panel may be determined to be low. In another example, when a ray output from a pixel is propagated toward a central portion of each of the left eye 501 and the right eye 503, as indicated by reference numeral 550, the confidence may be determined to increase. The display apparatus may determine a weight kernel of a corresponding pixel to increase or decrease a brightness of the corresponding pixel according to the confidence.

The display apparatus may adjust a degree of a binocular disparity that may cause crosstalk, and a brightness or an intensity of a pixel outputting a ray corresponding to each of the eyes based on a deviation of left and right colors caused by the binocular disparity, or may adjust a margin of a view area.

In an example, when a confidence of a result obtained by performing light field rendering on each of the pixels of the display panel based on the positions of the eyes is greater than or equal to a reference value, the display apparatus may increase a brightness of a corresponding pixel. In another example, when the confidence is less than the reference value, the display apparatus may reduce the brightness of the corresponding pixel.

When the ray is propagated toward the central portion of each of the left eye 501 and the right eye 503, as indicated by reference numeral 550, that is, when the confidence of the result obtained by performing light field rendering on each of the pixels of the display panel based on the positions of the eyes increases, the display apparatus may increase a brightness of a corresponding pixel, to increase an accuracy of an image to be displayed.

In an example, a brightness of a pixel corresponding to each of the eyes of the user may be adjusted based on a weight kernel determined based on a trade-off relationship between a brightness of an image and an accuracy of an image, and thus it is possible to increase the accuracy of the image.

For example, the display apparatus may determine a weight kernel for each 3D virtual object represented by the display panel. For example, due to eyestrain, a 3D display apparatus may project most content in the vicinity of a 2D plane (VID), and may display a portion of content to be emphasized as a 3D virtual object. The display apparatus may maintain a brightness of a corresponding pixel in a 2D plane, may reduce a brightness of a corresponding pixel for content including a 3D virtual object, based on a confidence of a result obtained by performing light field rendering, or may adjust a brightness of a pixel by intensities of subpixels included in common in pixels corresponding to each of the eyes, and thus it is possible to prevent an occurrence of crosstalk to increase an accuracy of an image.

Also, the display apparatus may estimate a depth between a 3D virtual object represented by the display panel and the eyes. The display apparatus may determine a weight kernel according to the confidence, based on the estimated depth. When the estimated depth is greater than a reference depth, the display apparatus may determine the weight kernel to increase a brightness of a corresponding pixel. When the estimated depth is less than or equal to the reference depth, the display apparatus may determine the weight kernel to reduce the brightness of the corresponding pixel.

Figure 6:
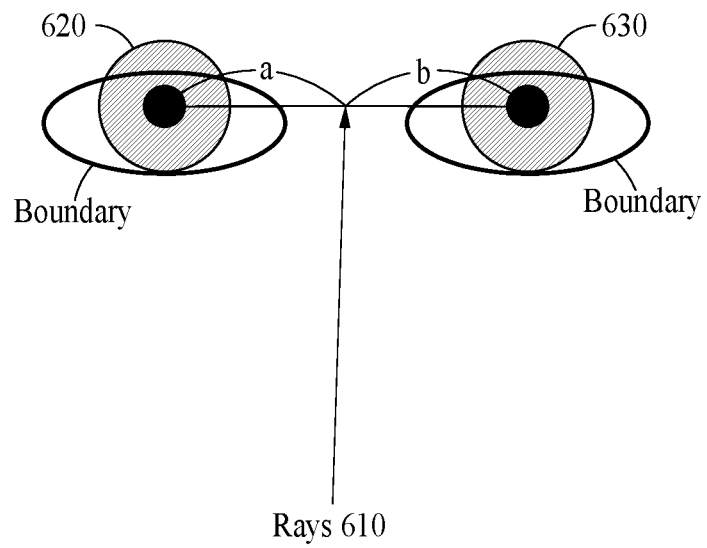
FIG. 6 illustrates an example of a confidence based on a relationship between both eyes of a user and rays output from a pixel.

FIG. 6 illustrates an example of a confidence based on a relationship between both eyes of a user and rays output from a predetermined pixel. FIG. 6 illustrates rays 610 output from pixels of a display panel and a left eye 620 and a right eye 630 of a user.

A distance between a ray 610 and each of the left eye 620 and the right eye 630 may correspond to a distance from a pupil center of each of the left eye 620 and the right eye 630 to the ray 610 when the ray 610 passes between the left eye 620 and the right eye 630. In FIG. 6, a distance between the ray 610 and the left eye 620 is denoted by "a", and a distance between the ray 610 and the right eye 630 is denoted by "b".

As described above, when rays 610 output from a pixel are propagated to a position between the left eye 620 and the right eye 630 as shown in FIG. 6, a confidence of a result obtained by performing light field rendering on each of the pixels of the display panel may be determined to be low.

The display apparatus may determine a boundary to determine which one of an image for the left eye 620 or an image for the right eye 630 is to be displayed by rays 610 within a range that is centered on the left eye 620 and the right eye 630. For example, when a range of neighboring rays is within a predetermined size from a center of an eye, the display apparatus may determine that the neighboring rays represent the same 3D virtual object or the same image. This is because significant crosstalk may occur when different images are represented by neighboring rays within a certain distance from the center of the eye.

Figure 7:
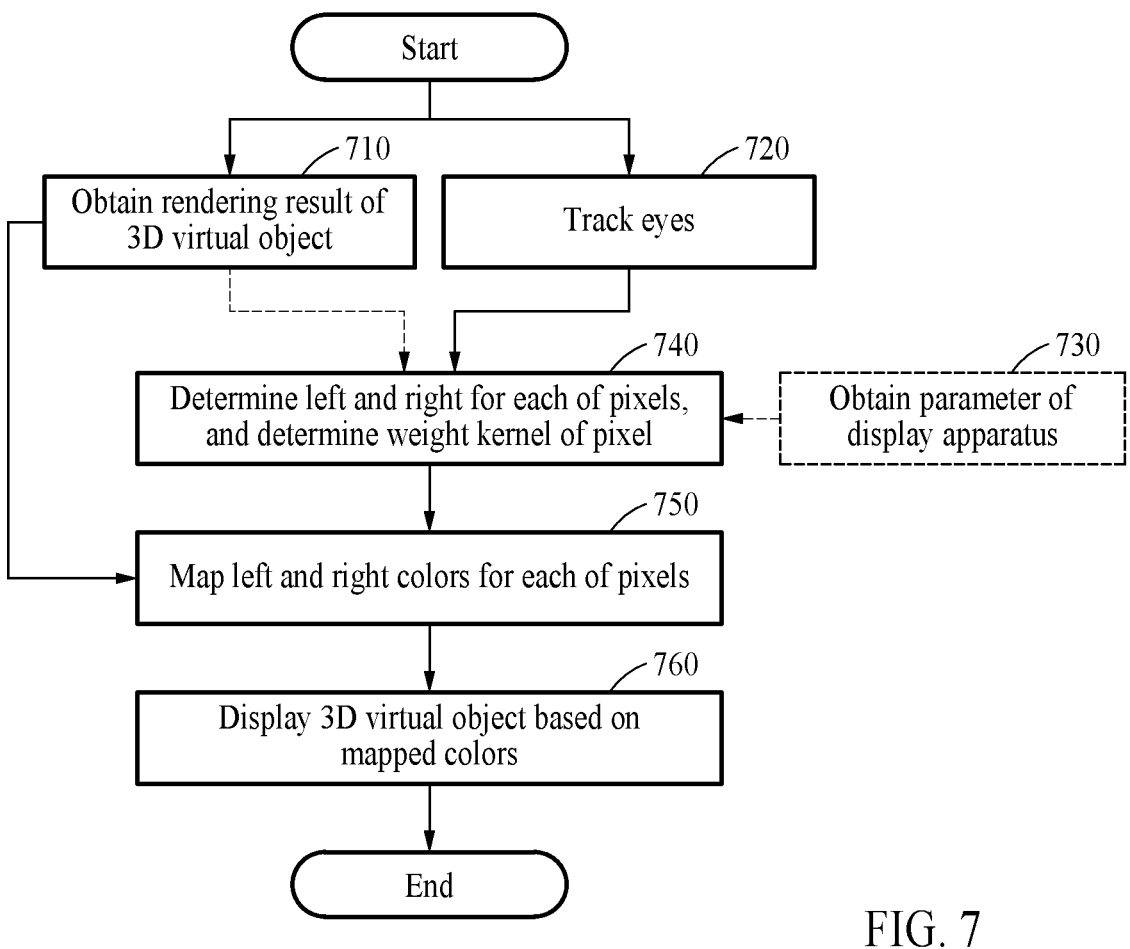
FIGS. 7 and 8 illustrate examples of an operating method of a display apparatus.

FIG. 7 illustrates another example of an operating method of a display apparatus. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. In FIG. 7, a part shown by a dashed line represents an optionally performed operation. One or more blocks of FIG. 7, and combinations of the blocks, can be implemented by special purpose hardware-based computer, such as a processor, that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, the display apparatus obtains a rendering result of a 3D virtual object generated by the display apparatus. The display apparatus may obtain at least one information of depth information and RGB color information corresponding to the 3D virtual object, based on the rendering result of the 3D virtual object. Depending on examples, the at least one information and/or the result of rendering the 3D virtual object obtained in operation 710 may be used in operation 740, or may not be used.

In operation 720, the display apparatus tracks positions of both eyes of a user including a left eye and a right eye. For example, the display apparatus may track the positions of the eyes using an eye tracker, to obtain 3D position coordinates of each of the eyes. In this example, an output value of the eye tracker may correspond to relative coordinates based on a point (for example, an upper left point of a display panel) of the display apparatus. 3D position coordinates of each of the eyes may correspond to, for example, 3D real number vector values left_x, left_y and left_z indicating a position of the left eye of the user, and 3D real number vector values right_x, right_y and right_z indicating a position of the right eye of the user.

Depending on examples, in operation 730, the display apparatus may obtain a parameter of the display apparatus. The parameter of display apparatus may include, but is not limited to, for example, a size of the display panel of the display apparatus, a lens parameter of the display panel, and a gap between pixels of the display panel. Depending on examples, operation 730 may be optionally performed, or may not be performed.

Operations 710 to 730 of FIG. 7 are not necessarily limited thereto. Operations 710 to 730 may be performed simultaneously or with a small time interval therebetween.

In operation 740, the display apparatus determines left and right for each of the pixels of the display panel based on all information obtained through operations 710 to 730, and determines a weight kernel of a corresponding pixel. The determining of the left and right for each of the pixels of the display panel may be construed as determining whether pixels corresponding to rays correspond to the left eye or the right eye. For example, the display apparatus may determine which one of the eyes is closer to the rays, based on the 3D position coordinates obtained in operation 720, and may determine the left and right for each of the pixels.

In operation 740, the display apparatus determines a weight kernel for each 3D virtual object received in operation 710, or changes the weight kernel based on at least one of the depth information and RGB color information corresponding to the 3D virtual object.

The display apparatus may reflect the RGB color information to the weight kernel, and may determine a value of a pixel corresponding to each of the eyes. The display apparatus may also determine the weight kernel according to a confidence, based on the parameter of the display apparatus obtained in operation 730.

In operation 750, the display apparatus maps left and right colors for each of the pixels based on the value of the pixel determined in operation 740. For example, the display apparatus may reflect the RGB color information obtained in operation 710 to the weight kernel, and may map left and right colors for each pixel corresponding to each of the eyes.

In operation 760, the display apparatus displays the 3D virtual object based on colors mapped in operation 750.

Figure 8:
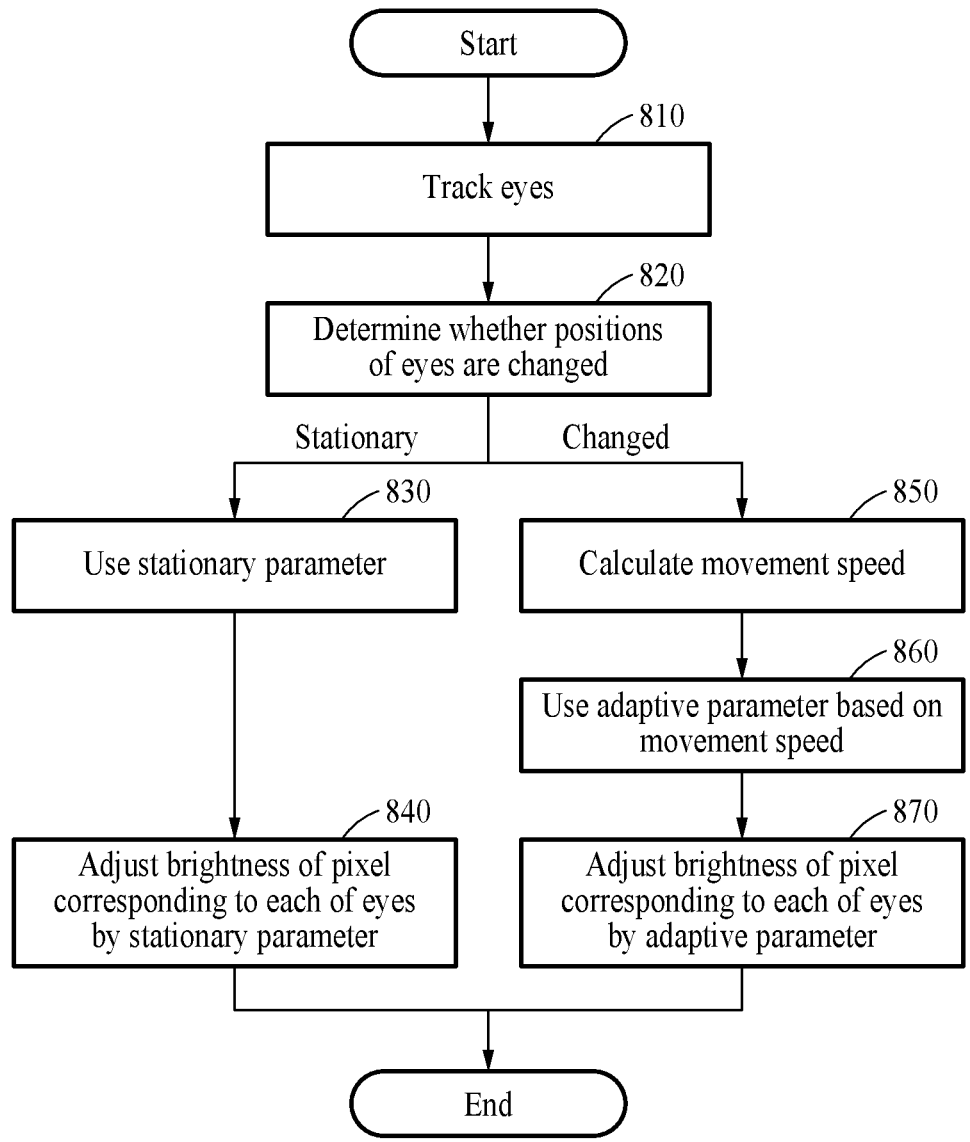

FIG. 8 illustrates another example of an operating method of a display apparatus. The operations in FIG. 8 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 8, and combinations of the blocks, can be implemented by special purpose hardware-based computer, such as a processor, that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here.

Referring to FIG. 8, in operation 810, the display apparatus tracks positions of both eyes of a user. For example, the display apparatus may track the positions of the eyes using an eye tracker or an interior camera.

In operation 820, the display apparatus determines whether the positions of the eyes are changed based on a result of operation 810. For example, the display apparatus may change a weight kernel based on whether the positions of the eyes are changed, for example, a stationary state or a moving state. The display apparatus may provide a pixel value or an image corresponding to the eyes properly according to changes in various circumstances including a movement of the user, by changing the weight kernel based on whether the positions of the eyes are changed.

In an example, when the positions of the eyes are determined to remain unchanged in operation 820, the display apparatus may determine to use a stationary parameter in operation 830. The stationary parameter may indicate a value or information of a weight kernel that is determined first based on a confidence of a result obtained by performing light field rendering on each of pixels of a display panel based on the positions of the eyes, when the weight kernel remains unchanged. In operation 840, the display apparatus adjusts a brightness of a pixel corresponding to each of the eyes by the stationary parameter.

In an example, when the positions of the eyes are determined to be changed in operation 820, the display apparatus may calculate a movement speed of the eyes in operation 850 and may determine to use an adaptive parameter based on the movement speed in operation 860. The adaptive parameter may indicate a value or information of a weight kernel that is determined based on the confidence and that is changed or supplemented.

In operation 870, the display apparatus adjusts a brightness of a pixel corresponding to each of the eyes by the adaptive parameter. For example, when the positions of the eyes are changed, the display apparatus may determine a value of a pixel corresponding to each of the eyes by an adaptive parameter used to adjust a brightness of a pixel corresponding to a view area.

Figure 9:
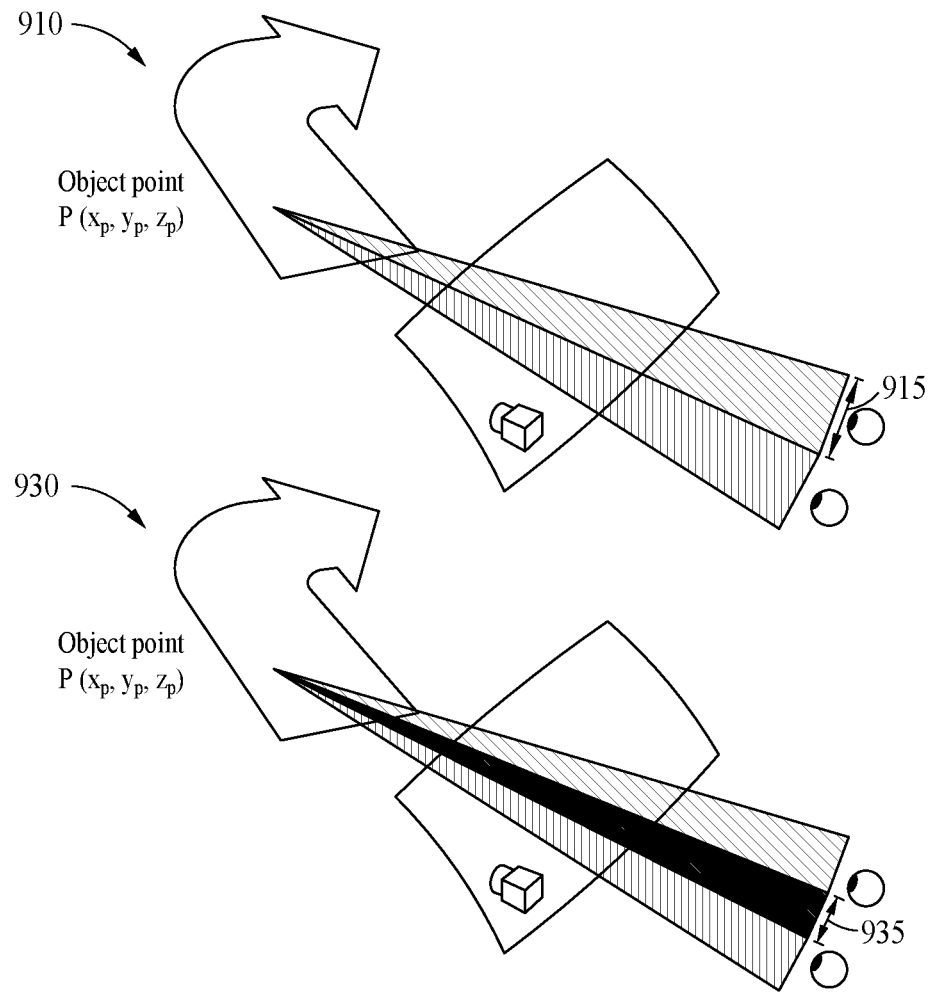
FIG. 9 illustrates an example of adjusting a brightness of a pixel in a margin area based on whether positions of both eyes of a user are changed.

FIG. 9 illustrates an example of adjusting a brightness of a pixel in a margin area based on whether positions of both eyes of a user are changed. FIG. 9 illustrates examples 910 and 930 in which a value of a pixel is determined adaptively based on a margin of a view area corresponding to one point $P(x_p, y_p, z_p)$ of a 3D virtual object displayed by a display panel.

In an example, a display apparatus may determine whether a pixel corresponding to a ray corresponds to a left eye or a right eye of a user, based on a confidence of a result obtained by performing light field rendering on each of pixels of a display panel based on positions of the eyes. The display apparatus may determine a margin of a view area corresponding to a range of directions of rays corresponding to the determined eye.

For example, when a view area 915 by rays that are to represent an image corresponding to each of the eyes is not considered, the display apparatus may determine the same pixel value including a brightness of a pixel corresponding to each of the eyes as shown in the example 910.

Depending on examples, the display apparatus may compare a preset reference value to a confidence in determining whether a pixel corresponding to a ray corresponds to the left eye or the right eye, that is, the confidence of the result obtained by performing light field rendering on each of the pixels of the display panel based on the positions of the eyes.

For example, when the confidence is less than the reference value, the display apparatus may reduce a brightness of a corresponding pixel. In this example, weight kernels of pixels adjacent to the corresponding pixel may include, for example, a brightness (or a mean brightness value) of the pixels adjacent to the corresponding pixel.

For example, it is assumed that some rays are determined as rays directed toward a right eye of a user with a probability of 51%, but actually correspond to rays directed toward a left eye of the user. In this example, the user may actually see a wrong image and feel uncomfortable. When the above ratio exceeds a predetermined value in the entire image, usability may significantly decrease.

In an example, when the confidence in determining whether a pixel corresponding to a ray corresponds to the left eye or the right eye is less than the reference value, the ray may be determined as an "undefined ray" instead of showing a wrong image. The display apparatus may assign a minimum value among color values of an image for a left eye and an image for a right eye to the pixel corresponding to the undefined ray. The display apparatus may correct a color value damaged due to the undefined ray through image processing. The above correction process may be applied to an area in which crosstalk mainly occurs, to minimize a decrease in the overall image quality.

For example, in the example 930, it is assumed that a minimum allowable separation distance based on each of both eyes of a user is not guaranteed due to a narrow gap between the eyes and that view areas respectively corresponding to the eyes overlap in a margin area 935. In this example, the margin area 935 may correspond to an area in which a confidence of a result obtained by performing light field rendering on each of pixels of a display panel based on positions of the eyes is less than a threshold.

In this example, a display apparatus may determine a value of a pixel of the margin area 935 to be a dark color according to the confidence. The display apparatus may determine a common value of pixels corresponding to the eyes as a value of a pixel of the margin area 935. For example, the display apparatus may obtain a first value of a corresponding pixel from an image corresponding to a left eye, and may obtain a second value of the corresponding pixel from an image corresponding to a right eye. The display apparatus may determine intensities of subpixels included in both the first value and the second value, based on intensities of subpixels included in the first value and intensities of subpixels included in the second value. The display apparatus may determine the value of the pixel of the margin area 935 as a predetermined dark color, for example, black.

The display apparatus may adjust a brightness of a pixel, based on the determined intensities of subpixels. The example 930 may be applied to a stationary state in which the positions of the eyes are not changed.

As described above, the display apparatus may adaptively adjust a brightness of a pixel corresponding to a view area according to various circumstances including a change in positions of both eyes of a user, to provide the user with a more accurate image and to minimize a decrease in an image quality.

Figure 10:
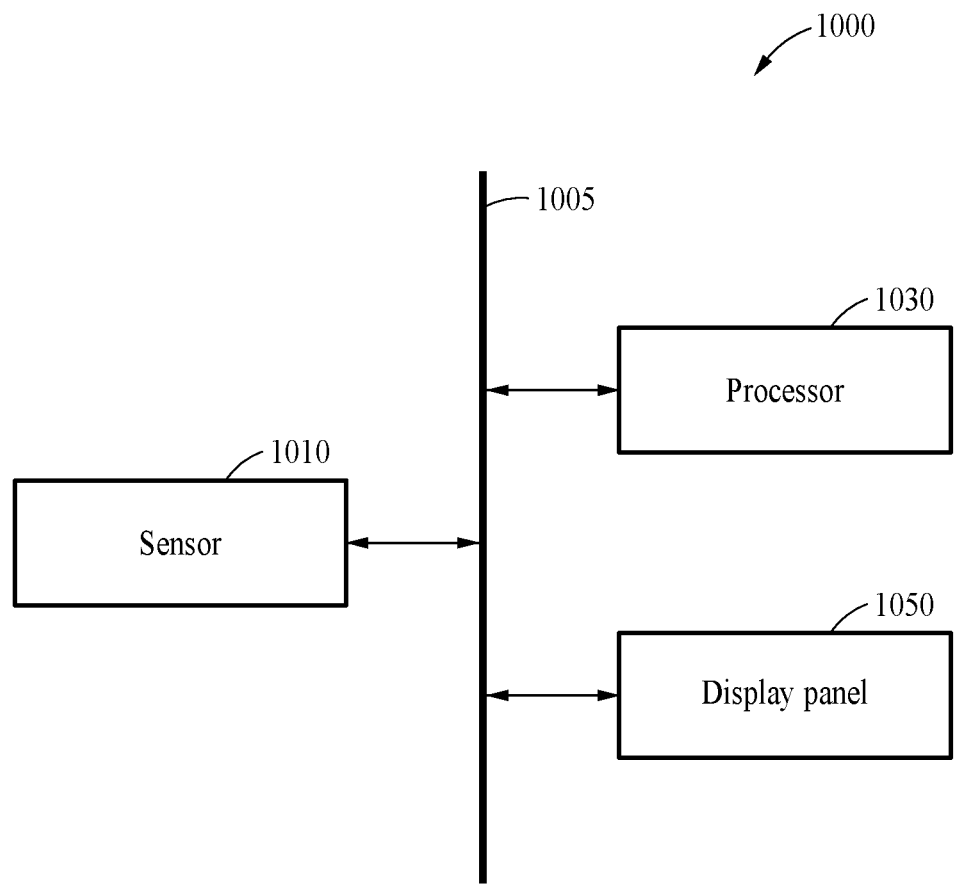
FIG. 10 illustrates an example of a display apparatus.

FIG. 10 illustrates an example of a display apparatus 1000. Referring to FIG. 10, the display apparatus 1000 includes a sensor 1010, a processor 1030, and a display panel 1050. The sensor 1010, the processor 1030, and the display panel 1050 may be connected to each other via a communication bus 1005.

The sensor 1010 may sense positions of both eyes of a user. The sensor 1010 may include, for example, an image sensor, an iris sensor, or an eye tracker. The sensor 1010 may output 3D coordinates corresponding to each of the eyes.

The processor 1030 may calculate a confidence of a result obtained by performing light field rendering on each of pixels of the display panel 1050 based on the positions of the eyes sensed by the sensor 1010. The processor 1030 may determine a weight kernel of a corresponding pixel according to the confidence. The processor 1030 may adjust a brightness of a pixel corresponding to each of the eyes based on the weight kernel.

The display panel 1050 may reproduce a value of the pixel including the brightness of the pixel determined by the processor 1030. The display panel 1050 may be, for example, a light field display panel.

The display apparatus 1000 may be included in various devices such as, for example, a HUD device, a 3D DID, a navigation device, a 3D mobile device, a smartphone, a smart TV, a tablet, a smart vehicle, a computer monitor, a display of an advanced driver-assistance systems (ADAS), an eye glass display (EGD), an IoT device, and other automated or assisted driving apparatus.

Also, the processor 1030 may perform at least one of the methods described above with reference to FIGS. 1A through 9 or an algorithm corresponding to at least one of the methods. The processor 1030 may be a hardware-implemented data processing device having a circuit that is physically structured to execute desired operations. For example, the desired operations may include code or instructions included in a program. The hardware-implemented data processing device may include, for example, a microprocessor, a single processor, independent processors, parallel processors, single-instruction single-data (SISD) multiprocessing, single-instruction multiple-data (SIM D) multiprocessing, multiple-instruction single-data (MISD) multiprocessing, multiple-instruction multiple-data (MIMD) multiprocessing, a central processing unit (CPU), a processor core, a multi-core processor, a multiprocessor, an application-specific integrated circuit (ASIC), and a field-programmable gate array (FPGA), a controller and an arithmetic logic unit (ALU), a DSP, a programmable logic unit (PLU), a graphics processing unit (GPU), a neural processing unit (NPU), or any other device capable of responding to and executing instructions in a defined manner. Further details regarding the processor 1030 is provided below.

The processor 1030 may execute a program and may control the display apparatus 1000. Codes of the program executed by the processor 1030 may be stored in a memory.

The display apparatus 1000 may further include the memory, although not shown in the drawings. The memory may store a variety of information generated in a processing process of the above-described processor 1030. Also, the memory may store a variety of data and programs. The memory may include, for example, a volatile memory or a non-volatile memory. The memory may include a large-capacity storage medium such as a hard disk to store a variety of data. Further details regarding the memory are provided below.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a field-programmable gate array (FPGA), an application-specific integrated circuit (ASIC), a programmable logic unit (PLU), a central processing unit (CPU), a graphics processing unit (GPU), a neural processing unit (NPU), a tensor processing unit (TPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions, or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the operating method of a display apparatus. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of operating a display apparatus, the method comprising:

calculating a confidence value obtained by performing light field rendering on each of pixels of a display panel based on positions of a left eye and a right eye, the confidence value indicating whether each of the pixels of the display panel corresponds to the left eye or the right eye;

determining a weight kernel of a corresponding pixel based on the confidence value;

determining whether the positions of the left eye and the right eye are changed;

in response to the positions of the left eye and the right eye being changed, calculating a movement speed of the left eye and the right eye and selecting a first adaptive parameter determined based on the movement speed, and in response to the positions of the left eye and the right eye being unchanged, selecting a non-adaptive second parameter; and adjusting a brightness of a pixel, of the display panel, corresponding to each of the left eye and the right eye based on the weight kernel using a selected parameter from the selecting.

2. The method of claim 1, wherein the weight kernel is determined to reduce a brightness of the corresponding pixel in response to a decrease in the confidence value.

3. The method of claim 1, wherein the weight kernel is determined to maintain a brightness of each of pixels having a confidence value greater than or equal to a reference value.

4. The method of claim 1, wherein the determining of the weight kernel comprises:

obtaining a characteristic of content to be represented by the display panel; and determining the weight kernel according to the confidence value and the characteristic of content.

5. The method of claim 1, wherein the determining of the weight kernel comprises:

increasing a brightness of a corresponding pixel, in response to the confidence value being greater than or equal to a reference value; and reducing the brightness of the corresponding pixel, in response to the confidence value being less than the reference value.

6. The method of claim 1, wherein the determining of the weight kernel comprises determining the weight kernel for each three-dimensional (3D) virtual object represented by the display panel.

7. The method of claim 1, wherein the determining of the weight kernel comprises:

estimating a depth between a 3D virtual object represented by the display panel and the left eye and the right eye; and determining the weight kernel according to the confidence value and the depth.

8. The method of claim 7, further comprising:

determining the weight kernel to increase a brightness of a corresponding pixel, in response to the depth being greater than a reference depth; and determine the weight kernel to reduce the brightness of the corresponding pixel, in response to the depth being less than or equal to the reference depth.

9. The method of claim 1, wherein the adjusting of the brightness of the pixel comprises adjusting intensities of subpixels included in the pixel based on the weight kernel.

10. The method of claim 1, wherein the adjusting of the brightness of the pixel comprises:

obtaining a first value of a corresponding pixel from an image corresponding to the left eye;

obtaining a second value of the corresponding pixel from an image corresponding to the right eye;

determining intensities of subpixels included in both the first value and the second value, based on intensities of subpixels included in the first value and intensities of subpixels included in the second value; and adjusting the brightness of the pixel, based on the determined intensities of the subpixels.

11. The method of claim 1, wherein the adjusting of the brightness of the pixel comprises, for each of the pixels:

obtaining a value of a corresponding pixel from an image corresponding to one of the left eye and the right eye based on a result obtained by performing light field rendering on the corresponding pixel; and applying a weight kernel of the corresponding pixel to the obtained value of the pixel.

12. The method of claim 1, further comprising:

tracking the positions of the left eye and the right eye.

13. The method of claim 12, further comprising:

determining whether the positions of any of the left eye and the right eye are changed, based on a result of the tracking, wherein the determining of the weight kernel comprises changing the weight kernel based on whether the positions of the left eye and the right eye are changed.

14. The method of claim 1, further comprising:

obtaining a parameter of the display apparatus, wherein the determining of the weight kernel comprises determining the weight kernel according to the confidence value and the parameter of the display apparatus.

15. The method of claim 1, wherein the performing of the light field rendering comprises determining whether each of the pixels of the display panel is to provide an image for one or more of the left eye and the right eye.

16. The method of claim 1, wherein the adjusting of the brightness comprises:

in response to the confidence value of a pixel corresponding to a ray being less than a threshold, assigning a minimum value among color values of an image for the left eye and an image for the right eye to the pixel corresponding to the ray.

17. A non-transitory computer-readable storage medium storing instructions that, when executed by a processor, cause the processor to perform the method of claim 1.

18. A display apparatus comprising:

a display panel; and a processor configured to calculate a confidence value obtained by performing light field rendering on each of pixels of the display panel based on positions of a left eye and a right eye, the confidence value indicating whether each of the pixels of the display panel corresponds to the left eye or the right eye, determine a weight kernel of a corresponding pixel based the confidence value, determine whether the positions of the left eye and the right eye are changed, in response to the position of the left eye and the right eye being changed, calculate a movement speed of the left eye and the right eye and select a first adaptive parameter determined based on the movement speed, and in response to the position of the left eye and the right eye being unchanged, select a non-adaptive second parameter, and adjust a brightness of a pixel, of the display panel, corresponding to each of the left eye and the right eye based on the weight kernel using a selected parameter from the selecting.

19. The display apparatus of claim 18, wherein the weight kernel is determined to reduce a brightness of the corresponding pixel in response to a decrease in the confidence value.

20. The display apparatus of claim 18, wherein the weight kernel is determined to maintain a brightness of each of pixels having a confidence value greater than or equal to a reference value.

21. The display apparatus of claim 18, wherein the processor is further configured to obtain a characteristic of content to be represented by the display panel, and to determine the weight kernel according to the confidence value and the characteristic of content.

22. The display apparatus of claim 18, wherein the processor is further configured to increase a brightness of a corresponding pixel in response to the confidence value being greater than or equal to a reference value, and to reduce the brightness of the corresponding pixel in response to the confidence value being less than the reference value.

23. The display apparatus of claim 18, wherein the processor is further configured to determine the weight kernel for each three-dimensional (3D) virtual object represented by the display panel.

24. The display apparatus of claim 18, wherein the processor is further configured to estimate a depth between a 3D virtual object represented by the display panel and the left eye and the right eye, and to determine the weight kernel according to the confidence value and the depth.

25. The display apparatus of claim 18, wherein the processor is further configured to adjust intensities of subpixels included in the pixel based on the weight kernel.

26. The display apparatus of claim 18, wherein the processor is further configured to obtain a first value of a corresponding pixel from an image corresponding to the left eye, to obtain a second value of the corresponding pixel from an image corresponding to the right eye, to determine intensities of subpixels included in both the first value and the second value, based on intensities of subpixels included in the first value and intensities of subpixels included in the second value, and to adjust the brightness of the pixel, based on the determined intensities of the subpixels.

27. The display apparatus of claim 18, wherein, for each of the pixels, the processor is further configured to obtain a value of a corresponding pixel from an image corresponding to one of the left eye and the right eye based on a result obtained by performing light field rendering on the corresponding pixel, and to apply a weight kernel of the corresponding pixel to the obtained value of the pixel.

28. The display apparatus of claim 18, wherein the processor is further configured to track the positions of the left eye and the right eye.

29. The display apparatus of claim 28, wherein the processor is further configured to determine whether the positions of any of the left eye and the right eye are changed, based on a result of the tracking, and to change the weight kernel based on whether the positions of the left eye and the right eye are changed.

30. The display apparatus of claim 18, further comprising:
a communication interface configured to obtain a parameter of the display apparatus,
wherein the processor is further configured to determine the weight kernel according to the confidence value and the parameter of the display apparatus.

31. The display apparatus of claim 18, wherein the display apparatus is comprised in any one or any combination of a head-up display (HUD) device, a 3D digital information display (DID), a navigation device, a 3D mobile device, a smartphone, a smart television (TV), a tablet, a smart vehicle, and an Internet of things (IoT) device.

32. The method of claim 1, wherein the determining of the weight kernel comprises determining a respective weight kernel for each of plural three-dimensional (3D) virtual objects represented by the display panel.

* * * * *